United States Patent
Zaslavsky et al.

(10) Patent No.: US 9,727,078 B2
(45) Date of Patent: Aug. 8, 2017

(54) TELEVISION ADAPTER

(71) Applicant: WebTuner, Corporation, Redmond, WA (US)

(72) Inventors: Eduard Zaslavsky, Issaquah, WA (US); Arthur Vaysman, San Jose, CA (US)

(73) Assignee: WEBTUNER, CORPORATION, Redmond, WA (US)

( * ) Notice: Subject to any disclaimer, the term of this patent is extended or adjusted under 35 U.S.C. 154(b) by 246 days.

(21) Appl. No.: 13/869,214

(22) Filed: Apr. 24, 2013

(65) Prior Publication Data

US 2013/0279101 A1 Oct. 24, 2013

Related U.S. Application Data

(60) Provisional application No. 61/637,352, filed on Apr. 24, 2012.

(51) Int. Cl.
*G06F 1/16* (2006.01)
*G06F 1/18* (2006.01)

(52) U.S. Cl.
CPC .............. *G06F 1/16* (2013.01); *G06F 1/1615* (2013.01); *G06F 1/1626* (2013.01); *G06F 1/18* (2013.01)

(58) Field of Classification Search
CPC .................................... G12B 9/02; G06F 1/16
USPC ...................................................... 361/679.32
See application file for complete search history.

(56) References Cited

U.S. PATENT DOCUMENTS

| | | |
|---|---|---|
| D611,415 S | 3/2010 | Andre |
| D671,489 S | 11/2012 | Zaslavsky |
| D671,490 S | 11/2012 | Zaslavsky |
| D671,491 S | 11/2012 | Zaslavsky |
| D673,909 S | 1/2013 | Zaslavsky |
| D680,070 S | 4/2013 | Zaslavsky |
| 8,497,866 B2* | 7/2013 | Daniel et al. ................. 345/520 |
| 8,599,246 B2* | 12/2013 | Oyagi ............................. 348/51 |
| 8,862,909 B2* | 10/2014 | Branover et al. ............. 713/300 |
| 8,878,864 B2* | 11/2014 | Baxter et al. ................. 345/552 |
| 8,976,028 B2* | 3/2015 | Caporizzo .................. 340/572.1 |
| 2006/0076124 A1* | 4/2006 | Sharifipour et al. ...... 165/104.15 |
| 2011/0202190 A1* | 8/2011 | Venkatakrishnan et al. . 700/286 |
| 2012/0151098 A1* | 6/2012 | Sullivan .......................... 710/13 |
| 2012/0243158 A1* | 9/2012 | Gentil ...................... 361/679.03 |

OTHER PUBLICATIONS

U.S. Appl. No. 29/418,955, Zaslavksy.

(Continued)

*Primary Examiner* — Anthony Q Edwards
(74) *Attorney, Agent, or Firm* — Volpe and Koenig, P.C.

(57) ABSTRACT

A computing device is disclosed. The computing device includes a housing having electrical plug blades for insertion into an electrical outlet, an AC/DC electrical converter contained within the housing, a system on a chip (SoC) powered by the converter and contained within the housing, at least one data storage device in data communication with the SoC and contained within the housing, a networking device in data communication with the SoC and contained within the housing, an input receiving device in data communication with the SoC and contained within the housing, and at least one output port in data communication with the SoC and contained within the housing.

12 Claims, 8 Drawing Sheets

(56) References Cited

OTHER PUBLICATIONS

U.S. Appl. No. 29/418,958, Zaslavksy.
U.S. Appl. No. 29/418,960, Zaslavksy.
U.S. Appl. No. 29/418,961, Zaslavksy.
U.S. Appl. No. 29/418,962, Zaslavksy.
U.S. Appl. No. 29/432,677, Zaslavksy.
U.S. Appl. No. 29/451,589, Zaslavksy.
U.S. Appl. No. 29/451,590, Zaslavksy.

* cited by examiner

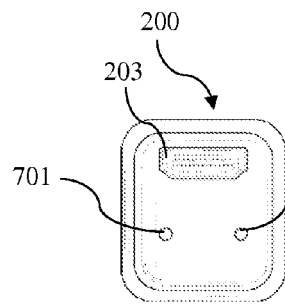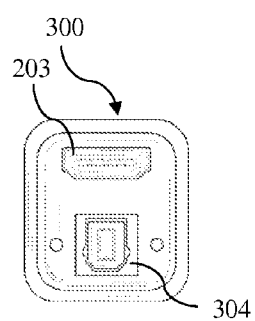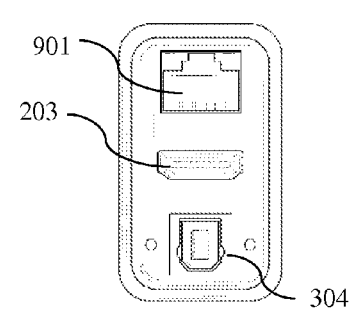
Figure 7A          Figure 7B          Figure 7C
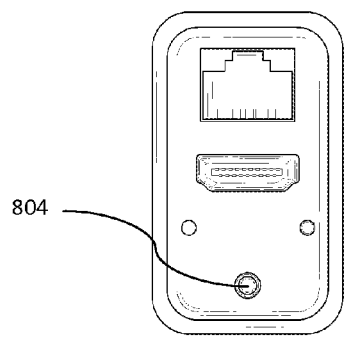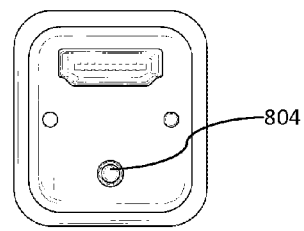
Figure 8A          Figure 8B
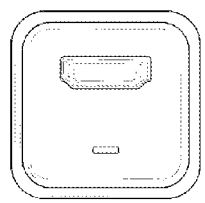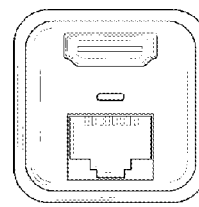
Figure 9A          Figure 9B

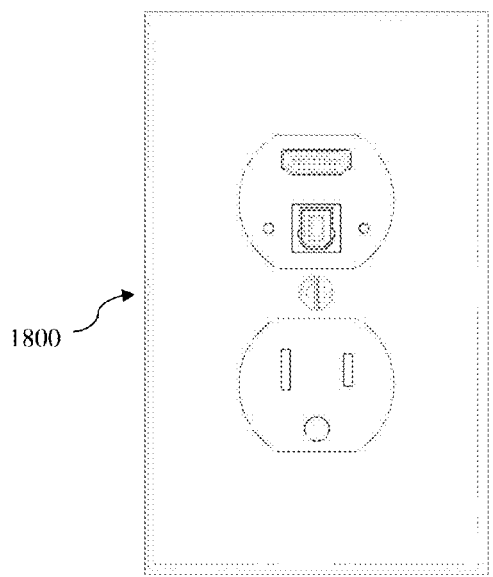 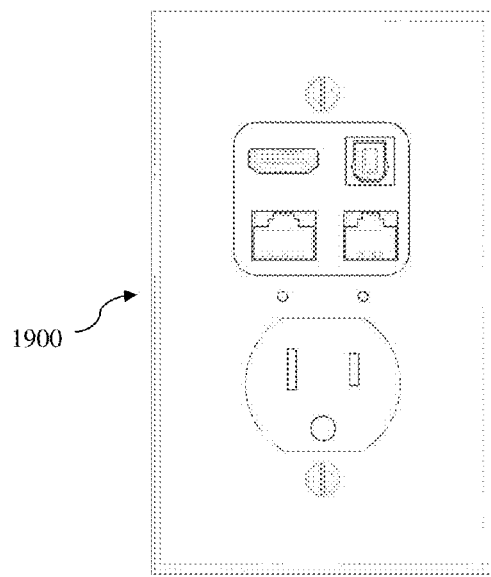
Figure 18                               Figure 19

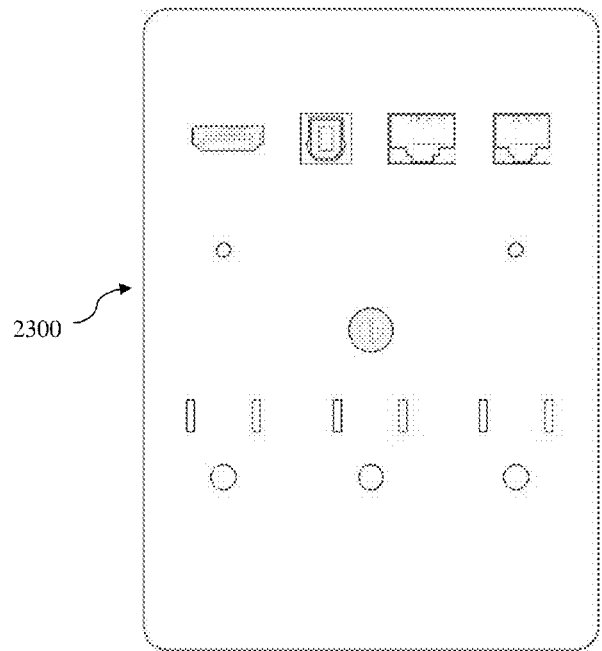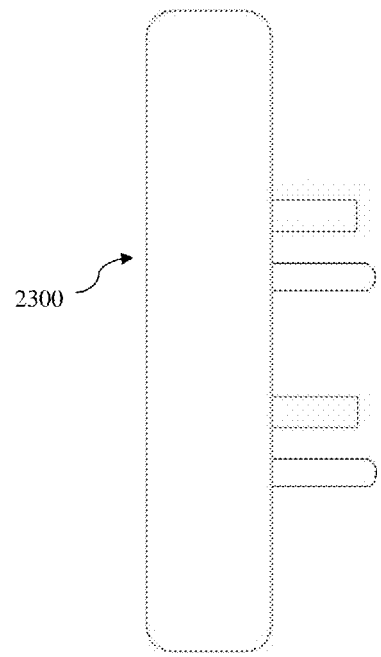
Figure 23　　　　　　　　　　Figure 24
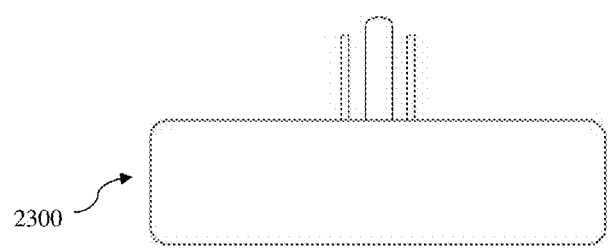
Figure 25

TELEVISION ADAPTER

REFERENCE TO RELATED APPLICATIONS

This application claims priority to U.S. provisional Application Ser. No. 61/637,352, filed Apr. 24, 2012, entitled "Television Adapter," which is hereby specifically and entirely incorporated by reference.

BACKGROUND

1. Field of the Invention

The invention is directed to computing devices for connection to a television, more specifically, the invention is directed to computing devices for streaming media to a television.

2. Background of the Invention

Streaming or media streaming is a technique for transferring data so that data can be processed as a steady and continuous stream. Streaming technologies are becoming increasingly important with the growth of the Internet because most users do not have a sufficiently fast access to download large multimedia files quickly. With streaming, the client browser or plug-in can display the data before the entire file has been transmitted.

For streaming to work, the client side receiving the data must be able to collect the data and send the data as a steady stream to the application that is processing the data and convert it to sound or pictures. This means that if the streaming client receives the data more quickly than required, it needs to save the excess data in a buffer. If the data doesn't come quickly enough, however, the presentation of the data will not be smooth.

Media is usually streamed from prerecorded files but can also be distributed as part of a live broadcast feed. In a live broadcast, the video signal is converted into a compressed digital signal and transmitted from a web server as multicast, sending a single file to multiple users at the same time.

Streaming media is transmitted by a server application and received and displayed in real-time by a client application called a media player. A media player can be either an integral part of a browser, a plug-in, a separate program, or a dedicated device. Furthermore, it is becoming more popular to connect devices to televisions (TVs) that are capable of displaying streaming media on the TV.

As televisions (TVs) become thinner, TV owners are becoming increasingly likely to want to forgo or hide any peripheral devices (e.g. cable boxes, and DVD or Blu-ray players). Following this trend, streaming media devices, such as the Roku or Apple TV, have become increasingly smaller. The reduction in size and power consumption of such computing devices enables their design, as a pluggable computing device, by integrating the computing device with a power supply. The reduction in size and integration with a power supply creates heat dissipations problems that are usually addressed by either inclusion of a fan or by a heat sink. However, both solutions have significant disadvantages. In the case of a fan, the disadvantages include additional noise, reduction in reliability, and additional power consumption. In the case of a heat sink, the disadvantages include, increases in cost and size. The reduction in the size of the computing devices also limits the room for adequate sized antenna for RF or other wireless connectivity.

SUMMARY OF THE INVENTION

The present invention overcomes the problems and disadvantages associated with current strategies and designs and provides new computing device.

One embodiment of the invention is directed to a computing device. The computing device comprises a housing having electrical plug blades for insertion into an electrical outlet, an AC/DC electrical converter contained within the housing, a system on a chip (SoC) powered by the converter and contained within the housing, at least one data storage device in data communication with the SoC and contained within the housing, a networking device in data communication with the SoC and contained within the housing, an input receiving device in data communication with the SoC and contained within the housing, and at least one output port in data communication with the SoC and contained within the housing.

Preferably, the electrical plug blades dissipate heat generated by the computing device. The computing device is preferably a streaming media player. The computing device preferably has no external wires. In a preferred embodiment, the SoC is comprised of a central processing unit and a graphics processing unit.

In a preferred embodiment, the at least one storage device is chosen from magnetic cassettes, hard drives, digital versatile disks, cartridges, random access memories, read only memory, flash drives, and dynamic random access memory. The computing device preferably further comprises at least one status light and at least one physical button.

Preferably, the networking device is chosen from a local area network device, a metropolitan area network device, a wide area network device, a wireless networking device, and a wired networking device. The input receiving device is preferably a wireless input transceiver. Preferably, the at least one output port is chosen from an HDMI port, an optical audio port, a serial port, an USB port, an s-video port, a coaxial cable port, a composite video port, a composite audio port, and a VGA port. The housing is preferably an electrical power plug, a cable, a surge protector, or an electrical splitter.

Another embodiment of the invention is directed to an electrical cable. The cable comprises a first end comprising an AC/DC electrical converter, a second end comprising at least one audio-visual output port, and a cord coupling the first end to the second end.

Preferably the second end further comprises at least one processing component. The cord preferably encloses at least one antenna.

Another embodiment of the invention is directed to a computing device. The computing device comprises a first housing enclosing an AC/DC electrical converter. a second housing, a cord coupling the first housing to the second housing, a system on a chip (SoC) powered by the converter and contained within the second housing, at least one data storage device in data communication with the SoC and contained within the second housing, a networking device in data communication with the SoC and contained within the second housing, an input receiving device in data communication with the SoC and contained within the second housing, and at least one output port in data communication with the SoC and contained within the second housing.

The SoC is preferably comprised of a central processing unit and a graphics processing unit. In a preferred embodiment, the at least one storage device is chosen from magnetic cassettes, hard drives, digital versatile disks, cartridges, random access memories, read only memory, flash drives, and dynamic random access memory. The computing device preferably further comprises at least one status light and at least one physical button.

Preferably, the networking device is chosen from a local area network device, a metropolitan area network device, a wide area network device, a wireless networking device, and a wired networking device. The input receiving device is preferably a wireless input transceiver. In a preferred embodiment, the at least one output port is chosen from an HDMI port, an optical audio port, a serial port, an USB port, an s-video port, a coaxial cable port, a composite video port, a composite audio port, and a VGA port. Preferably, the cord houses an electrical lead and at least one antenna. The cord preferably dissipates heat generated by the computing device.

Another embodiment of the invention is directed to a wall outlet. The wall outlet comprises an AC/DC electrical converter, a system on a chip (SoC) powered by the converter, at least one data storage device in data communication with the SoC, a networking device in data communication with the SoC, an input receiving device in data communication with the SoC, at least one output port in data communication with the SoC, an electrical outlet, and a faceplate.

Preferably, the faceplate conceals at least one antenna. In a preferred embodiment, the computing device is a streaming media player. The computing device preferably has no external wires. The SoC is preferably comprised of a central processing unit and a graphics processing unit. Preferably, the at least one storage device is chosen from magnetic cassettes, hard drives, digital versatile disks, cartridges, random access memories, read only memory, flash drives, and dynamic random access memory.

Preferably, the computing device further comprises at least one status light and at least one physical button. The networking device is preferably chosen from a local area network device, a metropolitan area network device, a wide area network device, a wireless networking device, and a wired networking device. Preferably, the input receiving device is a wireless input transceiver. In a preferred embodiment, the at least one output port is chosen from an HDMI port, an optical audio port, a serial port, an USB port, an s-video port, a coaxial cable port, a composite video port, a composite audio port, and a VGA port.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIGS. 2-9 are views of embodiments of a computing device housed within an electrical power plug.

FIGS. 15-19 are views of embodiments of a computing device housed within a wall outlet.

FIGS. 20-25 are views of embodiments of a computing device housed within a surge protector.

DESCRIPTION OF THE INVENTION

As embodied and broadly described herein, the disclosures herein provide detailed embodiments of the invention.

However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is to reduce the size and cost of a computing device with an integrated power supply directly pluggable into a power outlet. The invention can use a power outlet and power line cable connected thereto as a heat sink replacement.

To facilitate necessary heat transfer in the computing device, heat generated by the electronic components inside the computing device is channeled via heat conductive materials to the electric blades of the computing device in such a way that does not create a short-circuit. For example, dielectric thermal compounds can be applied to heat generating electronic components that are connected to the external blades.

Figure 1:
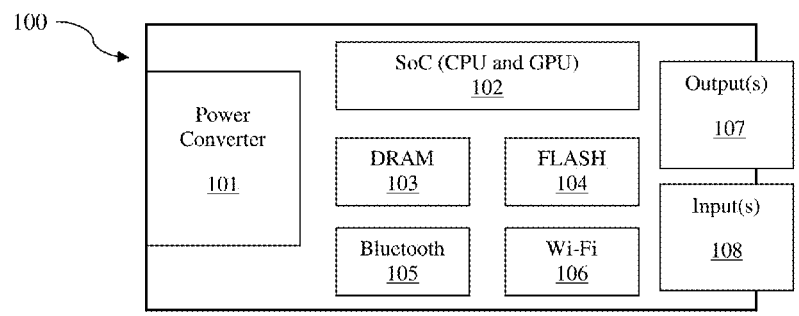
FIG. 1 is a schematic of an embodiment of a computing device.

FIG. 1 depicts a schematic of a preferred embodiment of a computing device 100 of the current invention. In the preferred embodiment computing device 100 is a streaming media device. Device 100 includes a power converter 101. For example, power converter 101 may convert from alternating current (AC) to direct current (DC). Preferably, power converter 101 accepts 120 volts at 60 hertz; however power converter 101 may be adapted to another standard international voltage. Power converter 101 preferably includes blades to mate with an electrical outlet. Additionally, as described herein, the blades may provide for heat dissipation. Power converter 101 is preferably polarized and may include a grounding blade. Additionally, power converter 101 may be adapted to be used in another standard international outlet.

Power converter 101 is used to supply power to the remaining components of streaming media device 100. Streaming media device 100 further includes an integrated circuit (i.e. a system on a chip (SoC)) 102. The SoC integrates multiple components of a computer or other electronic system into a single chip. It may contain digital, analog, mixed-signal, and radio-frequency functions all on a single chip substrate. SoC 102 preferably incorporates a central processing unit (CPU), a graphics processing unit (GPU), and a system bus that couples various system components including the system memory, dynamic random access memory (RAM) 103 and flash memory 104, to the SoC 102. The system bus may be one of several types of bus structures including a memory bus or memory controller, a peripheral bus, or a local bus using one of a variety of bus architectures. A basic input/output (BIOS) stored in flash memory 104 or the like, may provide the basic routine that helps to transfer information between elements within computing device 100, such as during start-up. The drives and the associated computer readable media provide nonvolatile storage of computer readable instructions, data structures, program modules and other data for computing device 100. The basic components are known to those of skill in the art and appropriate variations are contemplated.

Although the exemplary environment described herein employs flash memory, it is appreciated by those skilled in the art that other types of computer readable media which can store data that are accessible by a computer, such as magnetic cassettes, hard drives, digital versatile disks, cartridges, random access memories (RAMs), read only memory (ROM), a cable or wireless signal containing a bit stream and the like, may also be used in the exemplary operating environment.

Computing device 100 further includes a networking device 106. Networking devices 105 and 106 is able to connect to, for example, the Internet, one or more Local Area Networks ("LANs"), one or more Metropolitan Area Networks ("MANs"), one or more Wide Area Networks ("WANs"), one or more Intranets, etc. Preferably networking device 105 is a Bluetooth device, other networking devices can be used. Networking device 105 may be capable of connecting to wireless Bluetooth devices (e.g. a keyboard or a mouse). Preferably, networking device 106 is a wireless networking device (e.g. Wi-Fi), however hard wired networks can be coupled to networking device 106 (e.g. ethernet). Furthermore, networking device 106 may also connect to distributed computing environments where tasks are performed by local and remote processing devices that are linked (either by hardwired links, wireless links, or by a combination thereof) through a communications network. In a distributed computing environment, program modules may be located in both local and remote memory storage devices.

To enable user interaction with computing device 100, there is an input receiving device 108. Input receiving device 108 can receive input from a number of input mechanisms, such as a microphone for speech, a touch-sensitive screen for gesture or graphical input, a keyboard, a mouse, motion input, RJ-45, USB, and so forth. In some instances, multimodal systems enable a user to provide multiple types of input to communicate with the computing device 100. There is no restriction on the invention operating on any particular hardware arrangement and therefore the basic features here may easily be substituted for improved hardware or firmware arrangements as they are developed.

Computing device 100 further includes at least one output port 107. Output port 107 connects computing device 100 to a TV, speaker, projector, or other audio visual device. Preferably, output port 107 is a HDMI port, optical audio port, serial port, USB port, networking port, s-video port, coaxial cable port, composite video, composite audio, and/or VGA port. In preferred embodiments, computing device 100 may also include additional auxiliary components (e.g. power management devices or digital audio converters).

For clarity of explanation, the illustrative system embodiments are presented as comprising individual functional blocks. The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figures 2, 3:
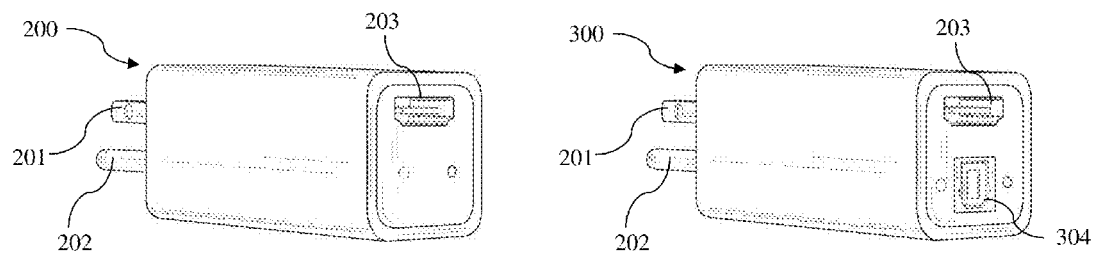

FIGS. 2-9 depict views of several embodiments of a computing device contained in a power plug. Computing device 200, depicted in FIG. 2, is a three dimensional rectangle having square ends and rectangular sides, however other shapes are envisioned. While the corners of the square ends are shown as rounded in the figures, the corners can be sharp or have another geometry. Preferably, the ends of computing device 200 are 26 mm (width) by 28 mm (height) while the sides are 28 mm by 54 mm. However, computing device 200 can have other sizes and shapes.

Computing device 200 has an outer housing. Outer housing is preferably plastic, however other materials can be used. For example, outer housing can be steel, aluminum, other metals, wood, rubber, nylon, glass, composite materials, other man made or natural materials, and combinations thereof. Preferably outer housing is a single unit, however multiple parts can comprise outer housing. Furthermore, outer housing can have a single color or multiple colors. For example, outer housing can be one color throughout, can have one color on the sides and another color at the ends, can have images, logos, patters, or other designs.

As depicted in FIG. 2, computing device 200 may have an HDMI port 202 or another port as described herein. Additionally, computing device 200 may have at least one status light 701, as shown in FIG. 7*a*. Preferably, status light 701 is an LED, although other indicators can be used. Status light 701 can indicate the power status of streaming media device 200, data transfer, or other statuses. Status light 701 may be a single color or multiple colors. Additionally, computing device 200 can have an audio device (e.g. a buzzer or a speaker) to further alert a user of the device's status or emit other sounds. Computing device 200 may also include at least one physical button 702. Physical button 702 may be a power button, reset button, or have another use. Furthermore, physical button 702 can have multiple purposes depending on the number of presses and the duration of the presses. While port 202, status light 701 and physical button 702 are all shown on the front of computing device 200, they can be located on another surface of computing device 200 and can each be located on difference surfaces.

Figure 6:
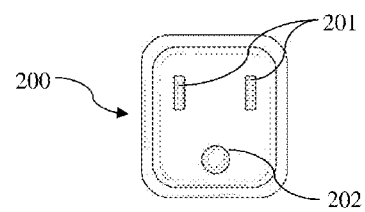

FIG. 6 is a back view of computing device 200. In the preferred embodiment, the back of computing device 200 has two flat electrical blades 201 and a round electrical blade 202. Flat electrical blades 201 are preferably polarized. Round electrical blade 202 preferably improves the stability of the connection between computing device 200 and an electrical outlet computing device 200 is plugged into. However, round electrical blade 202 can also be connected to ground. While the blade configuration is compatible with wall outlets in the United States, other blade configurations can be installed to mate with wall outlets in other countries.

Figure 4:
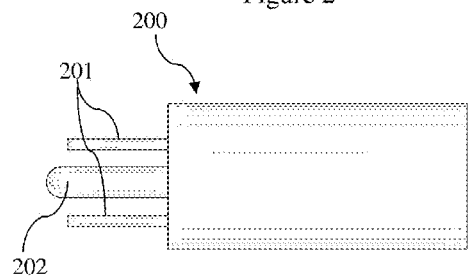
Figure 5:
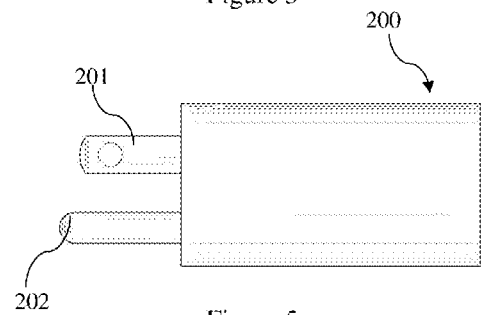

FIGS. 4 and 5 depict the top and side views of computing device 200, respectively. While one configuration is shown in FIGS. 4 and 5, other configurations are envisioned. For example FIG. 4 can be a side view while FIG. 5 can be a top view. Additionally, while blades 201 and 202 are shown as extending from the back of computing device 200, blades 201 and 202 can extend from another surface.

FIGS. 3 and 7b depict views of another embodiment of a computing device 300 contained in a power plug. Computing device 300 is similar to computing device 200 with the addition of a digital audio optical connectivity port 304. While FIGS. 3 and 7b show port 203 above port 304, the ports can be reversed, side by side, or in another configuration.

FIG. 7c depicts a front view of another embodiment of a computing device contained in a power plug. The computing device is similar to computing device 200 with the addition of a digital audio optical connectivity port 304 and a RJ-45 connectivity port 901. While HDMI port 203 is positioned between optical audio port 304 and port 901, the order of the ports can vary. Additionally, the location of status light and physical button can vary. In order to accommodate port 901, the outer housing is extended. In the preferred embodiment, the ends of the computing device are 26 mm by 44 mm, while the top and bottom of the computing device are 26 mm by 54 mm, and the sides of computing device 900 are 44 mm by 54 mm. Although other dimensions are envisioned.

FIGS. 8a and 8b depict front views of additional embodiments of a computing devices. The computing devices shown in FIGS. 8a and 8b are similar to the computing devices shown in the other embodiments with the addition of a 3.5 mm audio port 804. For example, as depicted in FIG. 8a, the computing device has a the 3.5 mm audio port, RJ-45 connectivity port, an HDMI port, an LED, and a physical button. The embodiment depicted in FIG. 8b, has the 3.5 mm audio port, an HDMI port, an LED, and a physical button.

FIGS. 9a and 9b depict front views of additional embodiments of a computing devices. The computing devices shown in FIGS. 9a and 9b are similar to the computing devices shown in the other embodiments. For example, as depicted in FIG. 9a, the computing device has an HDMI port and an LED (oval shaped in the embodiments shown in FIGS. 9a and 9b), while the embodiment depicted in FIG. 9b, has an HDMI port, an LED, and a RJ-45 connectivity port. Other combinations of ports, buttons, and LEDs are also envisioned, including different arrangements of the ports, buttons and LEDs on the device.

Figure 10:
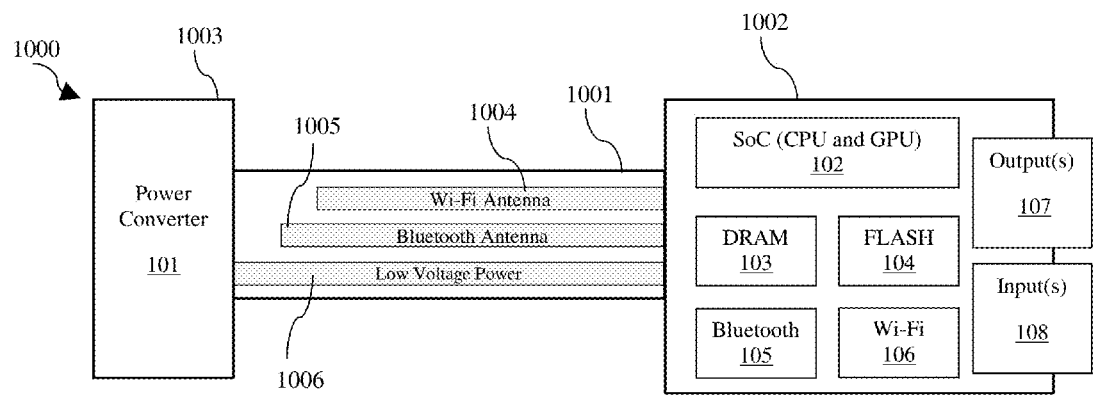
FIG. 10 is a schematic of another embodiment of a computing device.

FIG. 10 is a schematic of another embodiment of a computing device 1000. The components of computing device 1000 are similar to the components of computing device 100 except the components of computing device 1000 are contained within a cable. Therefore, the components described herein with respect to computing device 100 apply to computing device 1000. Computing device 1000 has a power end 1003 and a computing end 1002 connected by a flexible cord 1001. Preferably, power end 1003 houses a power converter 101. Additionally, power end 1003 may have electrical blades extending from the body thereof.

Computing end 1002 preferably houses the processing components of computing device 1000. For example, computing end 1002 can house SoC 102, dynamic random access memory (RAM) 103, flash memory 104, networking devices 105 and 106, input receiving device 108, output port 107, or other components. Processing components can also be housed in power end 1003 or within cord 1001.

Cord 1001 couples power end 1003 to computing end 1002. Preferably, cord 1001 is hollow and made of a flexible rubber, however cord 1001 can be made of other materials (e.g. plastic, fabrics, woven fibers, or other flexible materials). Cord 1001 is preferably 5 mm in diameter and can extend 50 mm, 60 mm, 70 mm, or another length.

Cord 1001 houses low voltage power cord 1006, which supplies power from power converter 101 to the processing components. Power cord 1006 is preferably a flexible metal (e.g. copper) sheathed in plastic, however other conductors of electricity can be used. Cord 1001 additionally houses antennae 1004 and 1005. In the preferred embodiment, antenna 1004 is a Wi-Fi antenna and antenna 1005 is a Bluetooth antenna, however other types and numbers of antennae can be housed within cord 1001 depending on the components of computing device 1000. Antennae 1004 and 1005 are preferably a flexible metal (e.g. copper) sheathed in plastic, however other devices capable of sending and receiving transmissions over the air can be used. While antennae 1004 and 1005 are shown as extending only a part of the length of cord 1001, antennae 1004 and 1005 can extend the whole length of cord 1001 or a portion thereof.

FIGS. 11-14 depict embodiments of computing devices 1100 and 1200. Power end 1003 and computing end 1002 are preferably contained in outer housings. The outer housings are preferably plastic, however other materials can be used. For example, the outer housings can be steel, aluminum, other metals, wood, rubber, nylon, glass, composite materials, other man made or natural materials, and combinations thereof. Preferably the outer housings are single units, however multiple parts can comprise the outer housings. The outer housings can have one color or multiple colors. For example, the outer housings can be one color throughout, can have one color on the sides and another color at the ends, can have images, logos, patters, or other designs. Furthermore, the two outer housings can appear different from each other. The outer housing of power end 1003 is preferably 26 mm by 26 mm by 26 mm, while the outer housing of computing end 1002 is preferably 44 mm by 14 mm by 60 mm. Although other dimensions are envisioned.

Power end 1003 preferably has two flat electrical blades and a round electrical blade extending therefrom, as described herein. Preferably, power end 1003 is coupled to cord 1001 by a flange. The flange is preferably a flexible rubber that protects cable 1001 from breaking at the point of contact between the outer housing and cord 1001. However, the flange can be of another material, for example, plastic, fiber, or metal. The flange has a larger outer diameter than the outer diameter of cord 1001 and has an inner diameter approximately equal to the outer diameter of cord 1001. The flange can be the same color as cable 1001 or another color. Preferably, the flange is recessed into the outer housing at the point of coupling. The diameter of the flange at the point of coupling with the outer housing is preferably larger than the remaining portion of the flange.

Figure 11:
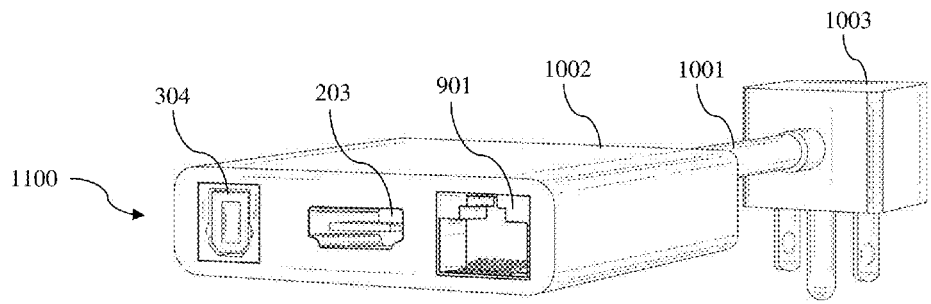
FIGS. 11-14 are views of embodiments of a computing device housed within a cable.
Figure 12:
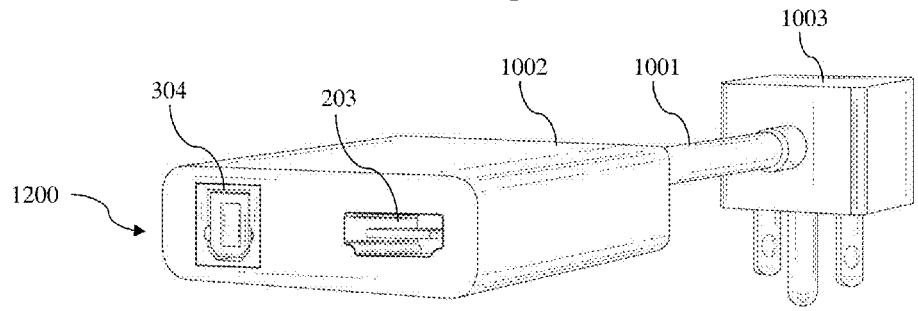
Figure 13:
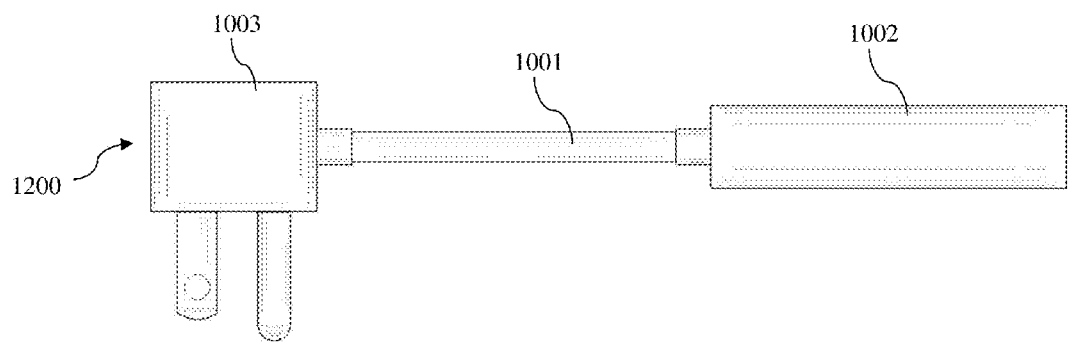
Figure 14:
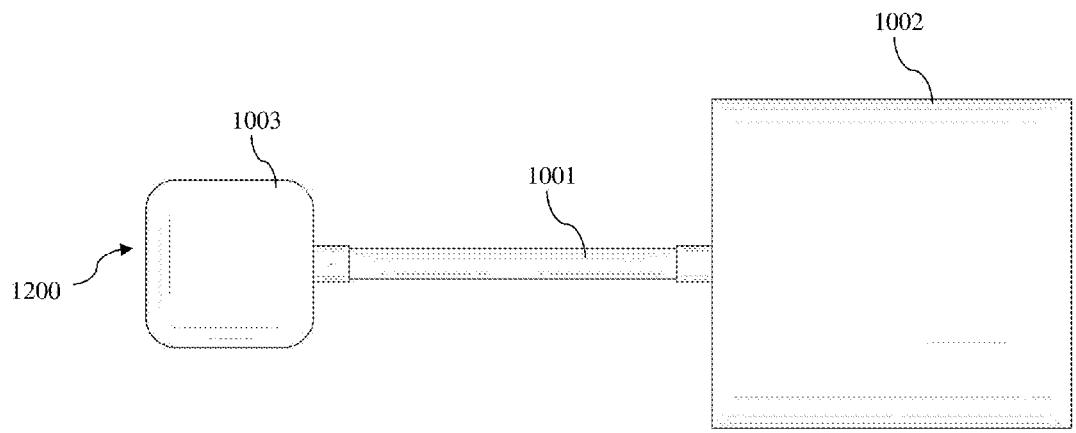

At the opposite end of cord 1001 from power end 1003 is another flange. The second flange is preferably identical to the first flange, however the second flange can be different than the first flange. The second flange is coupled to the outer housing of computing end 1002. As described herein, computing end 1002 houses the processing components of streaming media device 1100. As shown in FIG. 11, computing device 1100 can have an HDMI port 203, an optical audio port 304, and a RJ-45 networking port 901. The configuration depicted in FIG. 11 is one embodiment, other embodiments can have different configurations and different arrangements of components. In such embodiments, the dimensions of computing end 1002 can be adjusted accordingly to fit the components. The embodiment of computing device 1200 depicted in FIG. 12 is similar to computing device 1100, except computing device 1200 does not have a RJ-45 networking port.

Figure 15:
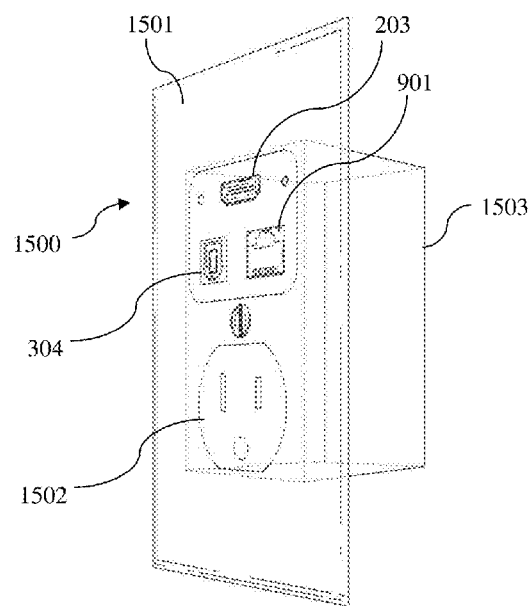
Figure 16:
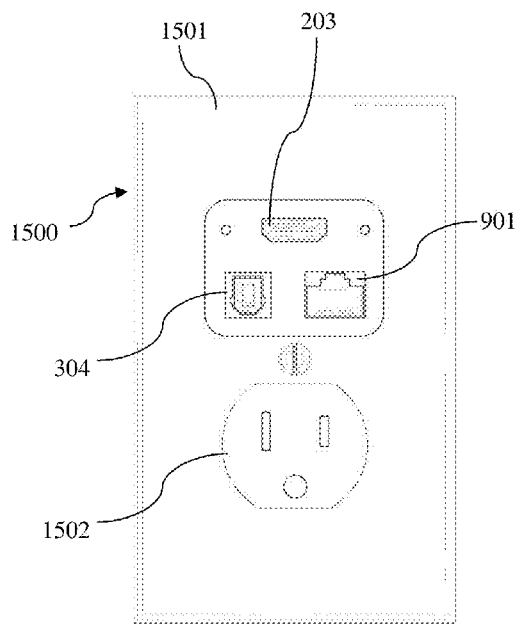
Figure 17:
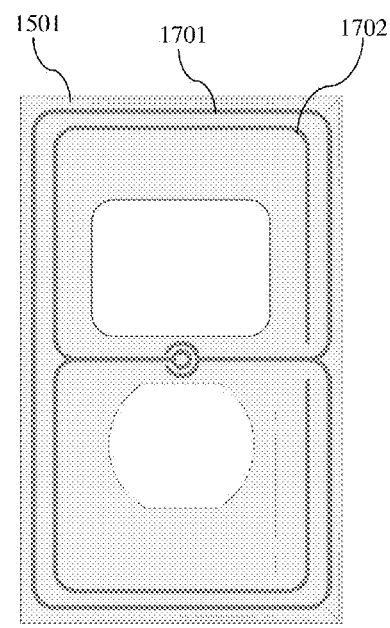

FIGS. 15-17 depict another embodiment of a computing device 1500. Computing device 1500 is integrated into a wall outlet. The components of computing device 1500 are similar to the components of computing device 100. Therefore, the components described herein with respect to computing device 100 apply to computing device 1500. The system is contained within a module 1503 that sits in a wall, while the exterior portion of computing device 1500 is surrounded by a faceplate 1501. In the preferred embodiment, one outlet is a traditional electrical socket 1502 and the other outlet contains HDMI multi-media connectivity port 203, digital audio optical connectivity port 304, and RJ-45 networking connectivity port 901. Additionally, there may be visual indicators and physical buttons. While computing device 1500 is shown in one configuration, other configurations can be implemented. For example the power outlet can be on top.

FIG. 17 depicts the back (i.e. the side facing the wall) of wall plate 1501. Wall plate 1501 may conceal one or more RF antennae. For example, wall plate 1501 can conceal Wi-Fi antenna 1701 and Bluetooth antenna 1702. By locating the antennae outside of computing device 1500, the size of the antennae can be increased, leading to better reception and improved connection reliability and speed. FIGS. 18 and 19 depict two additional embodiments of computing devices 1800 and 1900 housed in a wall outlet. Computing devices 1800 and 1900 are similar to computing device 1500 except that computing device 1800 does not have a RJ-45 port and computing device 1900 has an additional RF-11 telephony connectivity port.

Figure 20:
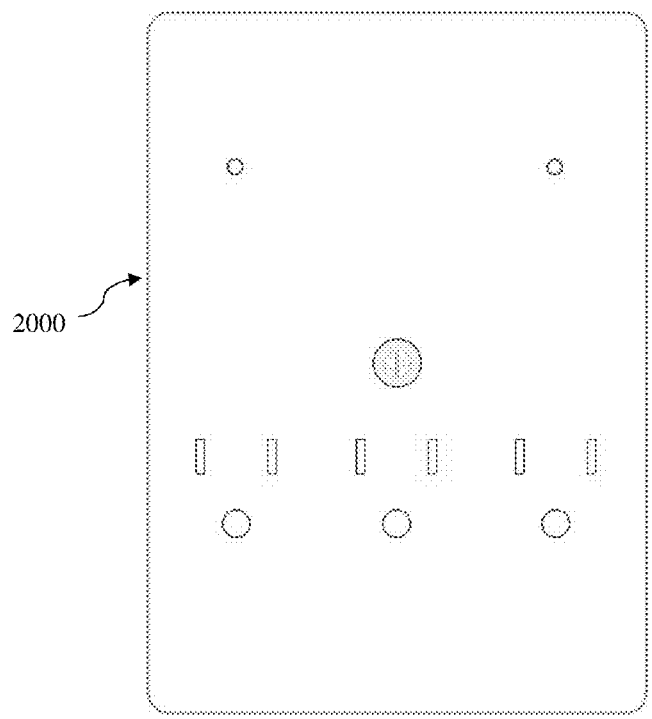
Figure 21:
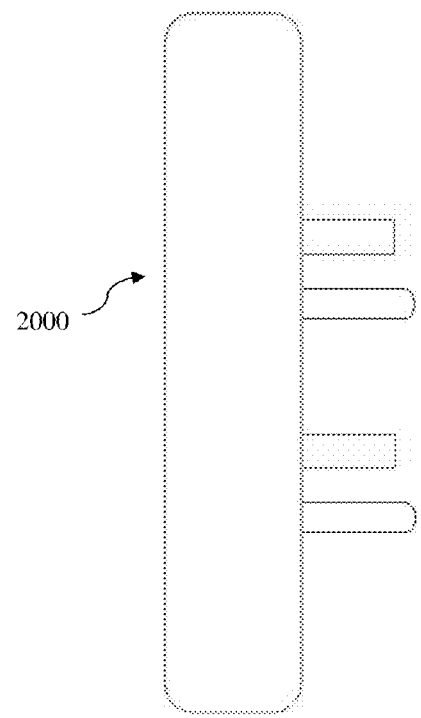
Figure 22:
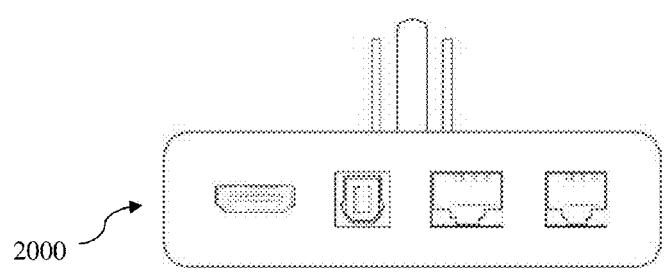

FIGS. 20-22 depict another embodiment of a computing device 2000 contained in a pluggable housing. The components of computing device 2000 are similar to the components of computing device 100. Therefore, the components described herein with respect to computing device 100 apply to computing device 2000. Computing device 2000 preferably has at least one set of electrical blades for insertion into an electrical outlet. Additionally, computing device 2000 has a plurality of electrical outlets on its front face to act as a surge protector or electrical splitter. Preferably, computing device 2000 has a HDMI multi-media port, a digital audio optical connectivity port, a RJ-45 network connectivity port, and a RF-11 telephony connectivity port positioned on one of the housing's sides. In other embodiments ports can be positioned on multiple sides or in different configurations from what is shown in FIG. 22. As shown in FIG. 20, computing device 2000 additionally may have an indicator light and a physical button.

FIGS. 23-25 depict another embodiment of a computing device 2300 contained in a pluggable housing. Computing device 2300 is similar to computing device 2000, except that the ports are on the front face of the housing. In other embodiments ports can be positioned on multiple sides or in different configurations from what is shown in FIG. 23.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A computing device, comprising:
    a housing having electrical plug blades for insertion into an electrical outlet;
    an AC/DC electrical converter contained within the housing;
    a system on a chip (SoC) powered by the converter and contained within the housing;
    at least one data storage device in data communication with the SoC and contained within the housing;
    a networking device in data communication with the SoC and contained within the housing;
    an input receiving device in data communication with the SoC and contained within the housing;
    an HDMI port/non-HDMI port combination in data communication with the SoC and contained within the housing;
    the SoC is comprised of a central processing unit and a graphics processing unit; and
    the HDMI port/non-HDMI port combination is positioned directly opposite the electrical plug blades across the housing, wherein the HDMI port/non-HDMI port combination and the electrical plug blades are positioned on opposite ends of the housing.

2. The computing device of claim 1, wherein the electrical plug blades dissipate heat generated by the computing device.

3. The computing device of claim 1, wherein the computing device is a streaming media player.

4. The computing device of claim 1, wherein the computing device has no external wires.

5. The computing device of claim 1, wherein the housing is an electrical power plug, a cable, a surge protector, or an electrical splitter.

6. The computing device of claim 1, wherein the at least one storage device is selected from the group consisting of magnetic cassettes, hard drives, digital versatile disks, cartridges, random access memories, read only memory, flash drives, and dynamic random access memory.

7. The computing device of claim 1, further comprising at least one status light and at least one physical button.

8. The computing device of claim 7, wherein the at least one status light and the at least one physical button are positioned coincident with the HDMI port/non-HDMI port combination on the housing.

9. The computing device of claim 1, wherein the networking device is selected from the group consisting of a local area network device, a metropolitan area network device, a wide area network device, a wireless networking device, and a wired networking device.

10. The computing device of claim 1, wherein the input receiving device is a wireless input transceiver.

11. The computing device of claim 1, wherein the HDMI port combination additionally comprises at least one output port selected from the group consisting of an optical audio port, a serial port, a USB port, an s-video port, a coaxial cable port, a composite video port, a composite audio port, and a VGA port.

12. The computing device of claim 1 comprises:
   HDMI port and the electrical plug blades are positioned adjacent to an upper surface of the housing; and
   at least one output port, of the HDMI port/non-HDMI port combination, and a round electrical blade are positioned adjacent to a lower surface of the housing, wherein the lower surface is opposite to the upper surface across the housing.

* * * * *